Dec. 28, 1965     C. FREY     3,226,727
SUSPENDED MODULE BUILDINGS
Filed Oct. 9, 1962     2 Sheets-Sheet 2
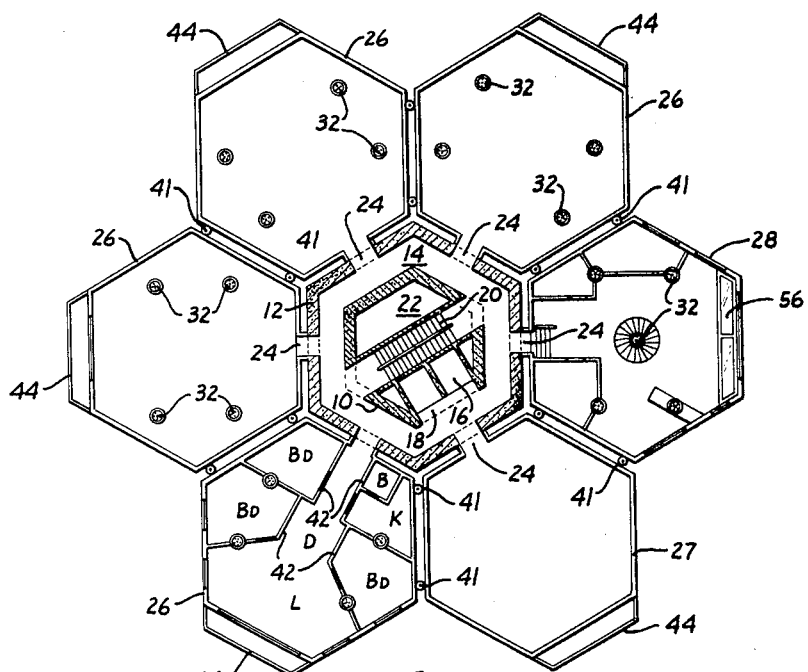
FIG. 2.
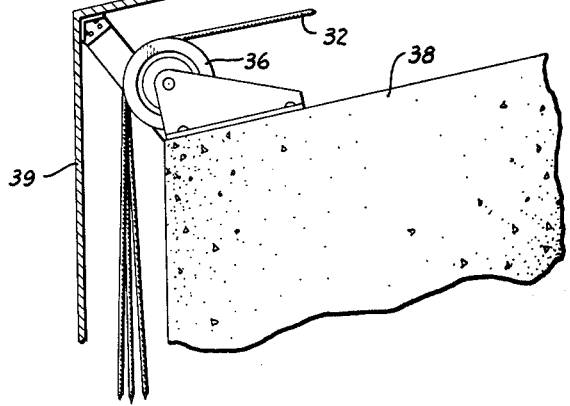
FIG. 3.
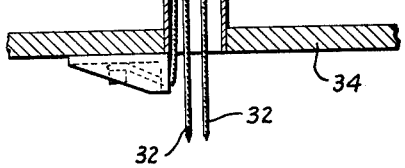
INVENTOR.
CHRISTIAN FREY
BY Naylor & Neal
ATTORNEYS United States Patent Office 3,226,727
Patented Dec. 28, 1965

3,226,727
SUSPENDED MODULE BUILDINGS
Christian Frey, San Francisco, Calif., assignor to Suspended Structures Incorporated, San Francisco, Calif., a corporation of California
Filed Oct. 9, 1962, Ser. No. 229,421
8 Claims. (Cl. 52—745)

This invention relates to architectural structures and more particularly to multiple unit buildings formed of a plurality of suspended modules and to a method of constructing the same.

In accordance with this invention, multiple unit buildings such as apartment houses, motels and the like are constructed by suspending a plurality of prefabricated or substantially prefabricated modules from a service tower. Each module forms a separate business or dwelling unit or a component of such a unit which is joined to other suspended components on the tower. Preferably each module is independent of the other modules and is suspended from the tower independently of the other modules with the modules distributed circumferentially around the tower and superposed one above another along the height of the tower.

The tower and modules are constructed independently with the tower design influencing module design only to the extent that it dictates a pattern of suspension cables or rods which the module must receive; in this way, the module manufacturer has substantially complete freedom in designing modules for the building, and the potential building tenant has very wide freedom in selecting the housing or business unit which he will install in the volume of space he might lease along the height of the tower.

A number of very substantial advantages are obtained by constructing buildings in this manner. Each of the separate modules which is to be suspended in the building may be constructed under ideal conditions in a factory where all required tools and power machinery are readily accessible and where plumbing and electrical wiring supplies and the like may be available in abundance. The modules may be completely prefabricated and furnished at the factory before they are shipped to their ultimate site and raised into position. When the modules are substantially completed in a factory in this manner, the building construction can progress uniformly throughout the year regardless of weather conditions, leaving only the service tower for construction during the normal construction season. In this regard, the modules when completed with roof and exterior walls may be delivered and raised into place at any time regardless of weather conditions.

In some situations, as where shipping of the module to the site may present problems, the module may be prefabricated in small sections at the factory and assembled at the site before it is raised into place or while it is being raised into place. Additionally, some advantages may be obtained under certain circumstances by raising the module into place in the form of a space frame and finishing and furnishing the module after it is in place.

The provision of suspended module buildings of this type permits the use of a wide variety of structural designs for the individual modules. For instance, each module may be constructed from conventional structural members loaded in compression with the entire module suspended on rods or cables which are attached to the module at its floor level. On the other hand, the structural strength of the module may be provided by a stressed skin with each module suspended on cables or the like attached to its roof. The use of light weight building construction expedients is thus not only possible but desirable, and the use of such techniques afford substantial savings in materials. Additionally, the material used in the cables or rods which support the modules is used most efficiently since the weight of the modules is thereby carried by tension instead of compression.

The cables or rods employed can be designed efficiently to carry the weight distribution of the module while employing a minimum quantity of materials in each cable or rod, and these advantages can be obtained by supporting the entire module on a single cable or rod while using lateral bracing connecting the module to the tower or other modules if desired. Where it is desirable to minimize the quantity of material in the cables and the like, the plural modules on a single tower may be supported from a plurality of cantilever support portions which are attached to the tower at different elevations.

The construction of suspended module buildings in accordance with this invention offers new opportunities for all those associated with the buildings and to many concerns which have been unable to compete in the building construction industry heretofore. Thus, suspended module buildings may introduce a sufficiently different concept in home architecture that homeowners may accept homes made completely from materials such as aluminum and synthetic resins, which the ordinary homeowner has heretofore rejected as being too unconventional; this may open vast new markets for suppliers and fabricators of these heretofore unconventional materials. The opportunity for the architect and builder to use radically new three dimensional shapes for homes may also give them complete freedom of choice to use new materials in the new shapes. The provision of service towers which will accept modules for suspension may permit old established concerns such as automobile, trailer and air frame manufacturers to diversify their operations and thereby even out their cyclic economic problems. Since the service tower itself imposes very few restrictions on the designs for the module it supports, the module owner who leases space on the tower has very wide freedom of choice in selecting the interior and exterior design for his module; additionally, the module owner may be free to trade in and replace his module, since the suspended module may be removed from its tower without causing any damage to itself or to the tower.

The service tower forming the core of the building of this invention may be constructed very efficiently with known concrete slip-form techniques. The tower is provided with a cantilever portion at a position substantially above the ground, and the material hoist assembly normally used on the slip-form equipment may be used to lift the cantilever portions into place. The modular building units may be lifted into place on the service tower and permanently suspended from the cantilever portion by rods or cables with the slip-form hoist or a permanent hoist installation in the tower being used to lift the modules. Each module is preferably prefabricated as a completed self sustaining unit with its own service elements such as plumbing, electrical wiring, heating, and the like which may be connected to service facilities in the service tower; this connection may be made by flexible means which may accommodate the structure to thermal expansion and contraction of the cables which suspend the modules. Additionally, the connection may be made by a standardized multiple conduit fitting which is detachably connected to the service tower thereby facilitating removal and replacement of any given module.

Where earthquake and wind conditions, for instance, may subject the buildings to large lateral forces, the bending movements of the tower may be modified by the installation of resilient bumpers between the modules and the tower.

Other objects and advantages of the invention will become apparent from the following description of one embodiment of the invention, reference being had to the attached drawings in which:

FIG. 2 is a horizontal sectional view, somewhat schematic, taken along the plane indicated at 2—2 in FIG. 1, and FIG. 3 is a fragmentary view in side elevation illustrating typical suspension components in the building of FIG. 1.

Figure 1:
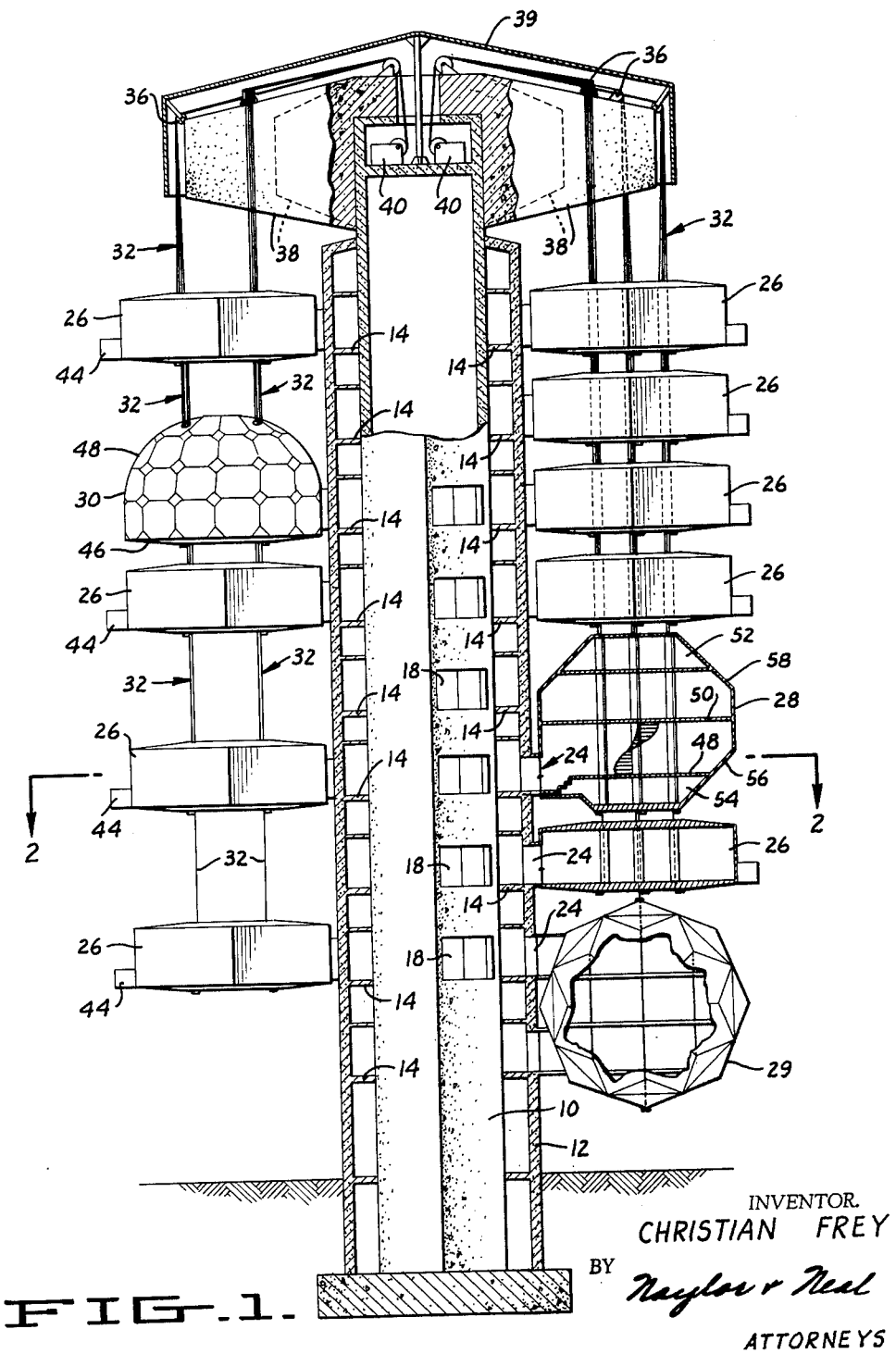
FIG. 1 is a view in side elevation partially in section of a suspended module building constructed in accordance with the principles of this invention.

Referring now in detail to the drawings, the building illustrated therein includes a double walled service column having inner and outer walls 10 and 12 respectively with a plurality of floor elements 14 mounted therebetween at various levels in the tower. An elevator shaft 16 (FIG. 2) is provided within the wall 10 and has access doors 18 at the levels of the various floor elements 14. A stair well 20 is also provided in the service tower inside the wall 10 as is a vertical chute 22 in which service facilities (not shown) are mounted for providing water, electricity, gas and sewage outlets at each floor level of the tower.

As best seen in FIG. 2, the outer wall 12 of the service tower is hexagonal provided with an exterior opening 24 in each of its six faces at the level of each floor element 14. A plurality of housing units 26, 27, 28, 29 and 30 are suspended adjacent to the service tower and provided with doorways communicating with the access openings 24 in the outer wall 12 of the service tower. In the embodiment of the invention illustrated, each of the modular housing units is suspended independently by cables 32 which are attached to the floor 34 (FIG. 3) of each module except module 29 which is suspended solely by a single central cable 32 attached to the roof of the module, the cables extending upwardly through passages in the modules thereabove and hence over sheaves 36 on a cantilever support portion 38 on top of the service tower. The ends of the cables 32 are connected to power hoists 40 in the top of the service tower, the hoists being used to lift the various modules into place adjacent to the service tower with the cables being detached from the hoist and permanently secured to the tower after the modules are in place. The cantilever support portion 38 and sheaves 36 may be covered by a roofing hood 39. As indicated in FIG. 2, the majority of the housing units 26–30 are supported with four cables 32 suspending each module, but the modules in one vertical stack of modules (containing the housing units 28 and 29) carry five cables 32. Bumpers and/or support cables 41 may be provided between the modules, the cables 41 serving as the sole support for the module 27 in FIG. 2.

As indicated above, tubular means are provided extending through the modules 26–30 permitting passage from the cantilever support portion 38 of the cables 32 which suspend lower modules on the building. As indicated in FIG. 2, these tubular passages may be provided in dividing walls 42 in each module or in other housings such as in the core of the circular staircase in module 28. Additionally, where it may be desirable to facilitate lateral removal of a module from the building, the cables may be provided in slots in the module where the slot extends continuously from the cable through the wall of the module which is closest to the service tower.

As indicated in FIGS. 1 and 2, a wide variety of designs may be employed in the design of individual modules of the building, the modules 26 being formed as hexagonal units each having a balcony 44 on its outer edge and having a plurality of rooms separated by the walls 42 with each of the modules comprising a complete living unit with living room, dining room, kitchen, bedrooms and bath as indicated by the letters on one of the units 26 in FIG. 2. Each of the units 26 is raised into place adjacent to the service tower after it has been completely prefabricated and moved to a position on the ground adjacent to the tower. On the other hand, the housing module 30 is made from a floor slab 46 and inflatable canopy 48 whereby the module 30 may be lifted into place prior to inflation of the canopy; where it is desirable, the canopy may be supported as by a geodesic dome or expandable space frame. As indicated in FIG. 1, the module 29 is built from a geodesic octagonal space frame in which the surface of the frame and the frame's structural strength are provided by a lattice of interlocking braces. This module is suspended by a single cable attached to its roof and is provided with axillary lateral stability by bracing members connecting the module to the tower at two floor levels.

The service tower is adapted to support a wide variety of shapes and sizes of modular units depending upon the desires of the individual occupants of the modules. As indicated in the drawings, one or more of the modular units on the tower may be omitted for the sake of privacy of a particular occupant, and multiple story modules such as the module 28 may be provided where an individual occupant desires to lease a volume of space adjacent to the tower which is adjacent to more than one floor level 14 of the tower or more than one of the hexagonal faces of the tower. The module 28 is provided with two floor levels 48 and 50, an attic 52 and basement 54. Some idea of the versatility of design permitted by the suspended module arrangement is indicated in the housing unit 28 where the lower level 48 is bounded by a downwardly facing window 56 in one of the octagonal walls of the building, and the second story 50 is provided with an upwardly facing window 58.

While certain general principles of the suspended module buildings of this invention and one specific embodiment thereof have been illustrated and described above, it will be obvious that many modifications thereof may be made without departing from the spirit and scope of the structure and method of the invention.

I claim:

1. The method of erecting a building which comprises:
   (A) erecting at least one substantially vertical column on the ground,
   (B) mounting at least one support portion on said column at an elevation substantially above the ground with said support portion extending laterally from the column,
   (C) prefabricating a plurality of housing units at locations remote from said column with each unit substantially structurally complete and self contained with at least one floor and a plurality of walls on said floor for laterally enclosing an occupiable area and service facilities therein,
   (D) providing a lifting mechanism adjacent to said column for lifting said units from positions adjacent to the ground to elevated positions above the ground,
   (E) moving a first one of said prefabricated units from a remote location to a location adjacent to said column,
   (F) moving a second one of said prefabricated units from a remote location to a location adjacent to said column,
   (G) operating a lifting mechanism to lift said first and second units to elevated positions above the ground,
   (H) permanently suspending said first and second units from said support portion, and
   (I) continuing to move, lift, and suspend additional ones of said prefabricated units until the building is substantially complete.

2. The method of claim 1 characterized further by the inclusion of the step of attaching said first and second units to each other prior to suspending said units from said support portion.

3. The method of claim 1 characterized further by the inclusion of the step of attaching said first and second units to each other at ground level adjacent to said column prior to operating said lifting mechanism to lift either of said units to said elevated positions.

4. The method of claim 1 characterized further in that said steps of operating said lifting mechanism and suspending said units are performed by
   (A) first operating said lifting mechanism to lift said first unit to one of said elevated positions prior to moving said second unit to the location adjacent to said column,
   (B) then permanently suspending said first unit,
   (C) then operating said lifting mechanism to lift said second unit to the other of said elevated positions, and
   (D) then permanently suspending said second unit.

5. The method of claim 1 characterized further by the inclusion of the following steps after the building is substantially complete:
   (A) detaching one of said units from said support portion,
   (B) lowering said detached unit to a position adjacent to the ground,
   (C) moving a new one of said units from a remote location to a position adjacent to said column,
   (D) raising said new unit to the elevated position adjacent to the column previously occupied by said detached unit, and
   (E) permanently suspending said new unit from said support portion.

6. The method of erecting a building which comprises:
   (A) erecting a substantially vertical column on the ground,
   (B) mounting a cantilever support portion on said column at an elevation substantially above the ground with said cantilever support portion projecting laterally from said column,
   (C) prefabricating a plurality of independent housing units at locations remote from said column with each unit substantially structurally complete and self contained with at least one floor and a plurality of walls on said floor for laterally enclosing a living area and service facilities therein,
   (D) providing a lifting mechanism adjacent to said column for lifting said units from positions adjacent to the ground to elevated positions adjacent to said column,
   (E) moving a first one of said prefabricated units from a remote location to a location adjacent to said column,
   (F) operating said lifting mechanism to lift said first unit to an elevated position adjacent to said column underneath said cantilever support portion,
   (G) permanently suspending said first unit from said cantilever support portion,
   (H) moving a second of said prefabricated units from a remote location to a location adjacent to said column,
   (I) operating said lifting mechanism to lift said second unit to an elevated position adjacent to the column underneath the cantilever support portion with the center of said second unit circumferentially spaced around said column from the center of said first unit,
   (J) permanently suspending said second unit from said cantilever support portion, and
   (K) continuing to move, lift, and suspend additional ones of said prefabricated units until the building is substantially complete.

7. The method of erecting a building which comprises:
   (A) erecting a substantially vertical column on the ground,
   (B) mounting a cantilever support portion on said column at an elevation substantially above the ground with said cantilever support portion projecting laterally from said column,
   (C) prefabricating at least three independent housing units at locations remote from said column with each unit substantially structurally complete and self contained with at least one floor and a plurality of walls on said floor for laterally enclosing a living area and service facilities therein,
   (D) providing a lifting mechanism adjacent to said column for lifting said units from positions adjacent to the ground to elevated positions adjacent to said column,
   (E) moving a first one of said prefabricated units from a remote location to a location adjacent to said column,
   (F) operating said lifting mechanism to lift said first unit to an elevated position adjacent to said column underneath said cantilever support portion,
   (G) permanently suspending said first unit from said cantilever support portion,
   (H) moving a second one of said prefabricated units from a remote location to a location adjacent to said column,
   (I) operating said lifting mechanism to lift said second unit to an elevated position adjacent to said column below said first unit,
   (J) permanently suspending said second unit from said cantilever support portion,
   (K) moving the third of said prefabricated units from a remote location to a location adjacent to said column,
   (L) operating said lifting mechanism to lift said third unit to an elevated position adjacent to the column underneath the cantilever support portion and outside of the vertically projected area of said first unit,
   (M) permanently suspending said third unit from said cantilever support portion, and
   (N) continuing to move, lift, and suspend additional ones of said prefabricated units until the building is substantially complete.

8. The method of erecting a building which comprises:
   (A) erecting a substantially vertical column on the ground,
   (B) mounting a cantilever support portion on said column at an elevation substantially above the ground with said cantilever support portion projecting laterally from said column,
   (C) prefabricating at least three independent housing units at locations remote from said column with each unit substantially structurally complete and self contained with at least one floor and a plurality of walls on said floor for laterally enclosing a living area and service facilities therein,
   (D) providing a lifting mechanism adjacent to said column for lifting said units from positions adjacent to the ground to elevated positions adjacent to said column,
   (E) moving a first one of said prefabricated units from a remote location to a location adjacent to said column,
   (F) operating said lifting mechanism to lift said first unit to an elevated position adjacent to said column underneath said cantilever support portion,
   (G) permanently suspending said first unit from said cantilever support portion by first tension members,
   (H) moving a second one of said prefabricated units from a remote location to a location adjacent to said column,
   (I) operating said lifting mechanism to lift said second unit to an elevated position adjacent to said column below said first unit and within the vertically projected area of said first unit,
   (J) permanently suspending said second unit from said cantilever support portion underneath said first unit with said second unit connected to said cantilever support portion by second tension members which are independent of said first tension members and said first unit, (K) moving the third of said prefabricated units from a remote location to a location adjacent to said column, (L) operating said lifting mechanism to lift said third unit to an elevated position adjacent to the column underneath the cantilever support portion and outside of the vertically projected area of said first unit, (M) permanently suspending said third unit from said cantilever support portion by third tension member, and (N) continuing to move, lift, and suspend additional ones of said prefabricated units until the building is substantially complete.

References Cited by the Examiner

UNITED STATES PATENTS

| | | | |
|---|---|---|---|
| 2,037,895 | 4/1936 | Gugler | 50—127 |
| 2,115,949 | 5/1938 | Gurber | 50—140 |
| 2,753,711 | 7/1956 | Weber | 50—534 |
| 2,852,931 | 9/1958 | Bonet | 50—534 |
| 3,058,264 | 10/1962 | Varlonga | 50—140 |

FOREIGN PATENTS

| | | |
|---|---|---|
| 857,443 | 12/1952 | Germany. |
| 788,086 | 12/1957 | Great Britain. |

OTHER REFERENCES

Popular Mechanics Publication, December 1959, p. 113.

HENRY C. SUTHERLAND, *Primary Examiner.*